United States Patent
Yoshida et al.

(10) Patent No.: US 6,330,488 B1
(45) Date of Patent: Dec. 11, 2001

(54) METHOD FOR CONTROLLING MACHINING PROCESS OF WORKPIECE

(75) Inventors: Tomoyuki Yoshida, Nagano; Noritsugu Kakegawa, Yamanashi, both of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/179,453

(22) Filed: Oct. 27, 1998

(30) Foreign Application Priority Data

Nov. 12, 1997 (JP) .................................................. 9-325161

(51) Int. Cl.⁷ .................................................. G06F 19/00
(52) U.S. Cl. ..................... 700/177; 700/175; 700/195; 451/1; 451/5; 29/603.09
(58) Field of Search .................... 700/177, 33, 34, 700/73, 55, 79, 109, 110, 117, 159, 161, 163, 173, 175, 195, 164; 702/65; 451/1, 5, 8, 10, 11; 29/593, 603.01, 603.1, 603.07, 603.09, 603.14–603.16

(56) References Cited

U.S. PATENT DOCUMENTS

| | | | |
|---|---|---|---|
| 4,689,877 | 9/1987 | Church | 29/603 |
| 4,914,868 * | 4/1990 | Church et al. | 451/5 |
| 5,065,483 | 11/1991 | Zammit | 29/603 |
| 5,620,356 | 4/1997 | Lackey et al. | 451/5 |
| 5,669,133 | 9/1997 | George | 29/603.16 |
| 5,991,698 * | 11/1999 | Hao et al. | 702/65 |
| 6,027,397 * | 2/2000 | Church et al. | 451/1 |
| 6,132,290 * | 10/2000 | Sugiyama et al. | 451/10 |

FOREIGN PATENT DOCUMENTS 0 361 778   4/1990   (EP).

* cited by examiner

Primary Examiner—William Grant
Assistant Examiner—Steven R. Garland
(74) Attorney, Agent, or Firm—Arent Fox Kintner Plotkin & Kahn, PLLC (57) ABSTRACT

A method for controlling a machining process of a workpiece includes a step of measuring amounts of machining of the workpiece by a plurality of sensors located at different positions on the workpiece, the sensors providing detection signals which represent the respective measured amounts, a step of removing the detection signal when the detection signal has an abnormal value which is extremely different in comparison with values of the other detection signals by using a smoothing method, and a step of controlling the machining of the workpiece depending upon the remaining detection signals from the sensors.

9 Claims, 8 Drawing Sheets

METHOD FOR CONTROLLING MACHINING PROCESS OF WORKPIECE

FIELD OF THE INVENTION

The present invention relates to a method for controlling a machining process of a workpiece, particularly to a machining process control method in a height control process of a thinfilm magnetic head.

DESCRIPTION OF THE RELATED ART

In fabricating a thin-film magnetic head, a wafer with a large number of thin-film magnetic head elements is cut into rows so that a plurality of magnetic head sliders are sequentially coupled or aligned therein, and then each bar is processed for various works.

For example, control of a properties-determining height of a magnetoresistive effect (MR) head element (MR height) is executed by lapping an air bearing surface (ABS) of each bar. During the lapping of the ABS, the MR height is monitored by an electrical signal from a lapping control sensor called as a RLG (Resistance Lapping Guide) or ELG (Electric Lapping Guide) sensor to correct the bending of the bar and to control the stop position of the lapping, so as to obtain optimum properties of the MR head element. Such RLG machining process is described in for example U.S. Pat. No. 4,689,877.

However, according to the RLG machining process in which the machining amount is controlled based upon the detection signals from the RLG sensors, the following problem may occur. That is, if the detection signals include a signal having an abnormal value, the machining amount may become an extraordinal amount and therefore a workpiece such as a MR head element may be suffered excess lapping causing the good element to fail.

SUMMARY OF THE INVENTION

It is therefore an object of the present invention to provide a method for controlling a machining process of a workpiece, whereby correct machining control of the workpiece can be expected even if detected values of sensors include an abnormal value.

According to the present invention, a method for controlling a machining process of a workpiece includes a step of measuring amounts of machining of the workpiece by a plurality of sensors located at different positions on the workpiece, the sensors providing detection signals which represent the respective measured amounts, a step of removing the detection signal when the detection signal has an abnormal value which is extremely different in comparison with values of the other detection signals by using a smoothing method, and a step of controlling the machining of the workpiece depending upon the remaining detection signals from the sensors.

The machining of the workpiece is controlled depending upon the remaining detection signals after an abnormal value of the detection signal is removed by using the smoothing method. Therefore, the machining control can be always performed in accordance with the correct data causing decrease in magnetic head yields to prevent.

It is preferred that the removing step includes a step of calculating each rate of change between values of the detection signals of adjacent two sensors with respect to a distance between the adjacent two sensors, and a step of determining removal of the detection signal of each sensor depending upon a difference in the rates of change of the each sensor with respect to two sensors adjacent to the each sensor.

It is also preferred that the removing step further includes a step of omitting the detection signal with either the maximum value or the minimum value when a positive square root of sum of squares of differences of the rates of change exceeds a predetermined value.

It is preferred that the removing step includes a step of calculating an average value, a standard deviation and a regression line of values of the detection signals, a step of determining removal of the detection signal when a value of the detection signal is out of a range from the calculated regression line, the range being predetermined in accordance with a required precision for machining the workpiece, and a step of omitting the detection signal when the determining step determines the removal of the detection signal. The calculating step, the determining step and the omitting step may be repeated.

It is preferred that the controlling step includes a step of calculating a quaternary regression curve depending upon the remaining detection signals from the sensors, and a step of executing the machining control of the workpiece so that the calculated quaternary regression curve approaches to a straight line.

The workpiece may be a bar on which a plurality of thin-film magnetic head elements are aligned. This bar is obtained by cutting a wafer.

In this case, it is preferred that the controlling step includes a step of controlling a properties-determining height of the thin-film magnetic head elements on the bar by lapping an air bearing surface of the bar and by correcting bending of the bar, and that the values of the detection signals are machining amount values of the properties-determining height obtained from sensed signals of a plurality of sensors located at different positions on the bar.

The properties-determining height controlling step may include a step of measuring resistance values of the sensors, the resistance values being varied in accordance with the lapping and the correction of bending, and a step of calculating the machining amount values in accordance with the measured resistance values.

It is preferred that the controlling step includes a step of interpolating, when the removed detection signal is a signal from the sensor located nearest to one end of the bar, the values of the detection signals from the sensor adjacent to the end located sensor to provide a substitute detection signal. The properties-determining height control step is executed by using the remaining detection signals and the substitute detection signal.

The present invention can be used in various bar machining control using detection signals from sensors other than the properties-determining height control. Furthermore, the present invention can be applied to various machining control of workpieces other than the bar with a plurality of magnetic head elements.

Further objects and advantages of the present invention will be apparent from the following description of the preferred embodiments of the invention as illustrated in the accompanying drawings.

DESCRIPTION OF THE PREFERRED EMBODIMENTS

Figure 1:
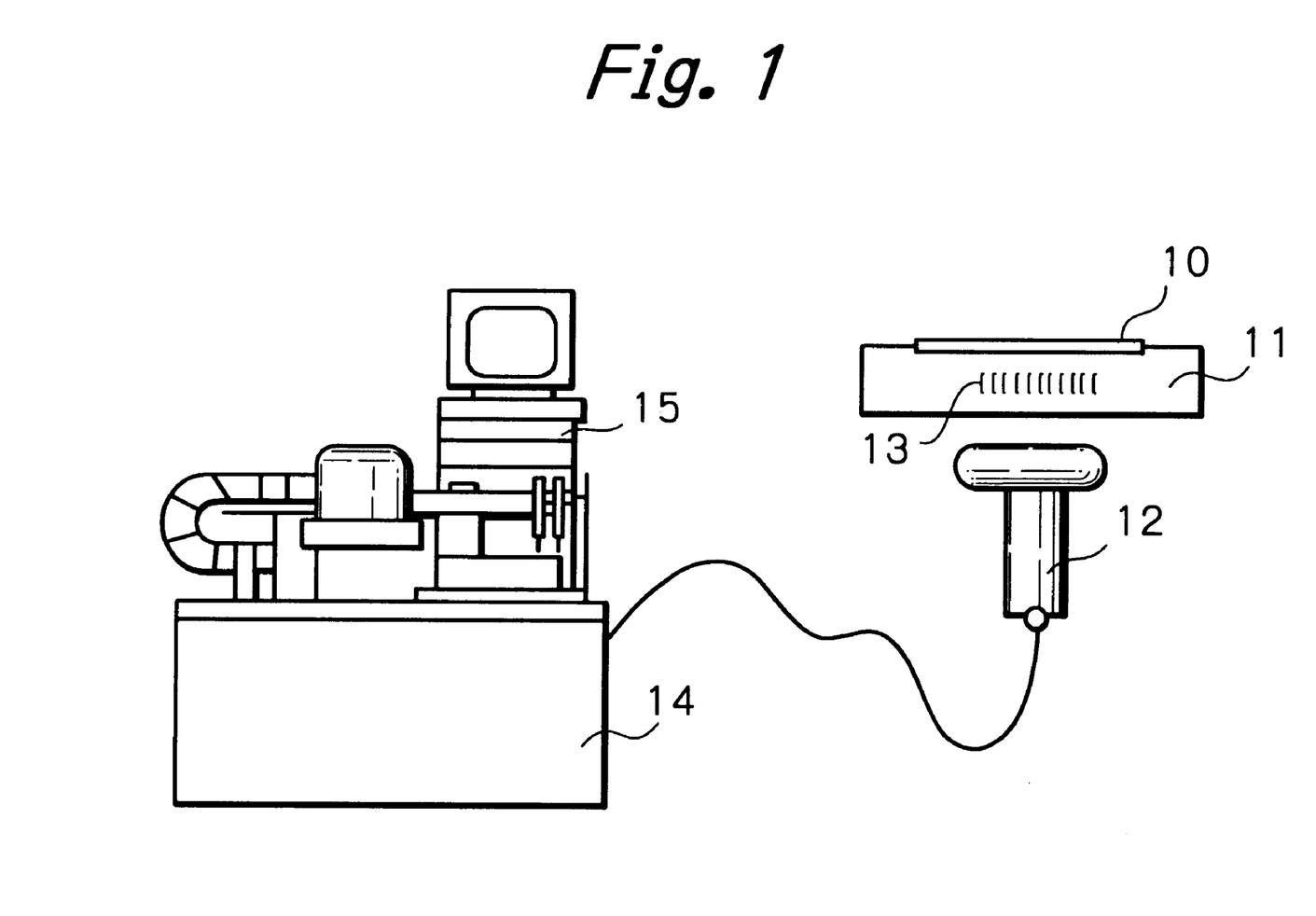
FIG. 1 is a view schematically illustrating a part of constitution of a RLG machining system used in manufacturing of a thin-film magnetic head slider with a MR head element according to a preferred embodiment of the present invention.
Figure 2:
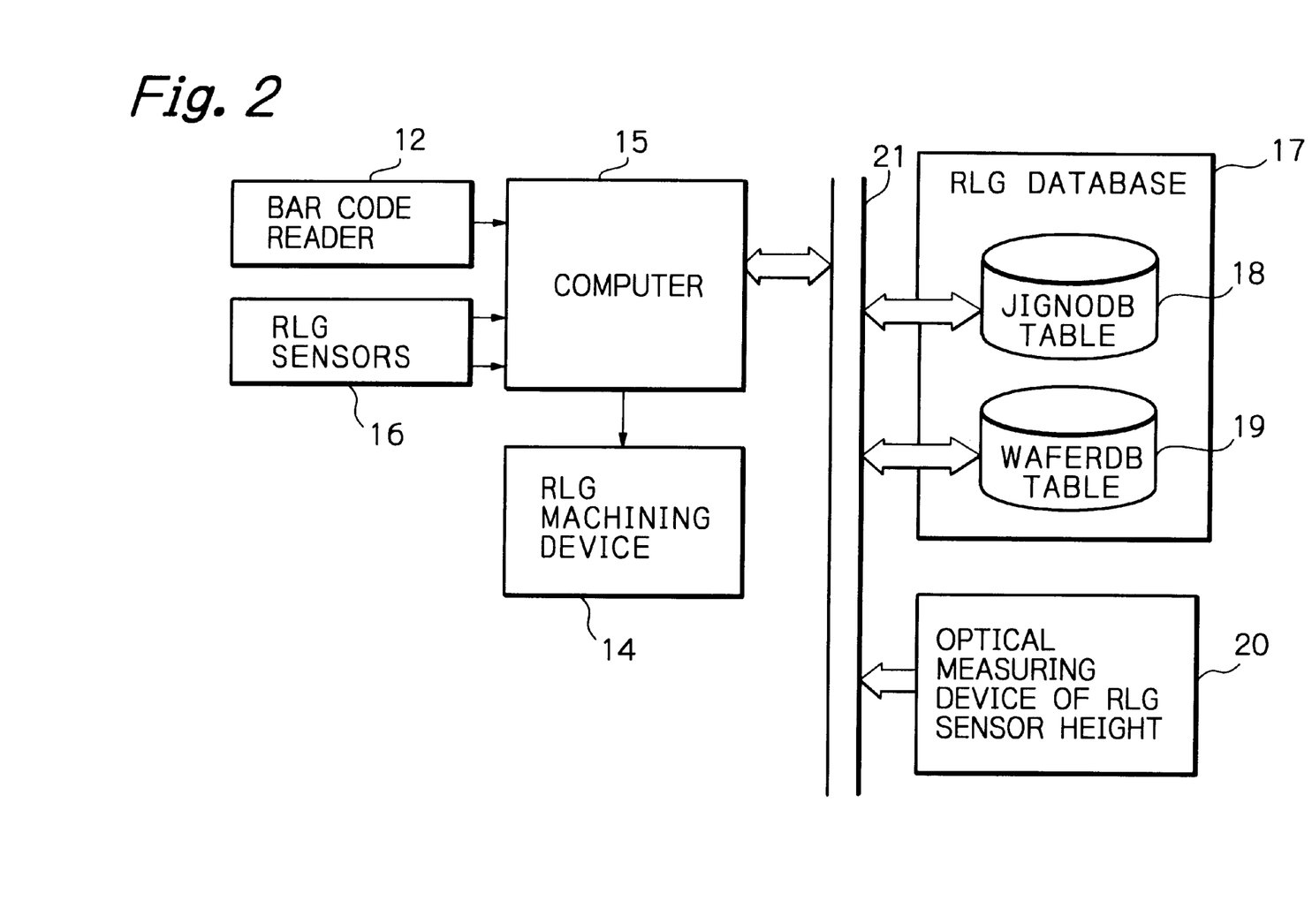
FIG. 2 is a block diagram illustrating electrical constitution of the embodiment shown in FIG. 1.

FIG. 1 schematically illustrates a part of constitution of a RLG machining system for carrying out a MR height machining process according to a preferred embodiment of the present invention, and FIG. 2 illustrates electrical constitution of the embodiment in FIG. 1.

In FIGS. 1 and 2, reference numeral 10 denotes a bar in which a plurality of thin-film magnetic head sliders formed by cutting a wafer (not shown) are aligned, 11 denotes a jig for the RLG machining to which the bar 10 is attached, 12 denotes a bar code reader for reading a bar code 13 provided on the jig 11, 14 denotes a RLG machining device for carrying out the MR height machining process, 15 denotes a personal computer electrically connected to this RLG machining device 14 and the bar code reader 12, 16 denotes a plurality of RLG sensors (lapping control sensors) provided on the bar 10 and connected to the computer 15, 17 denotes a RLG database having a jig number database (JIGNODB) table 18 and a wafer database (WAFERDB) table 19, and 20 denotes an optical measuring device of RLG sensor height. The computer 15, the RLG database 17 and the sensor height optical measuring device 20 can transmit and receive data through a network such as LAN 21. Although not shown in FIG. 2, a plurality of sets each composed of the computer 15 and the RLG machining device 14 can be connected to the LAN 21.

In this embodiment, the jig 11 is formed by a white ceramic material, and a black colored bar code which represents a jig number for identifying this jig itself (identification sign) is formed on a side surface of the jig 11 by laser processing.

The RLG machining device 14 conducts control of stopping position for MR height (or throat height) machining of the bar 10, and correction of bending of the bar in control of the computer 15. The structure of this type of machining device is known from, for example, U.S. Pat. No. 5,620,356.

Figure 3:
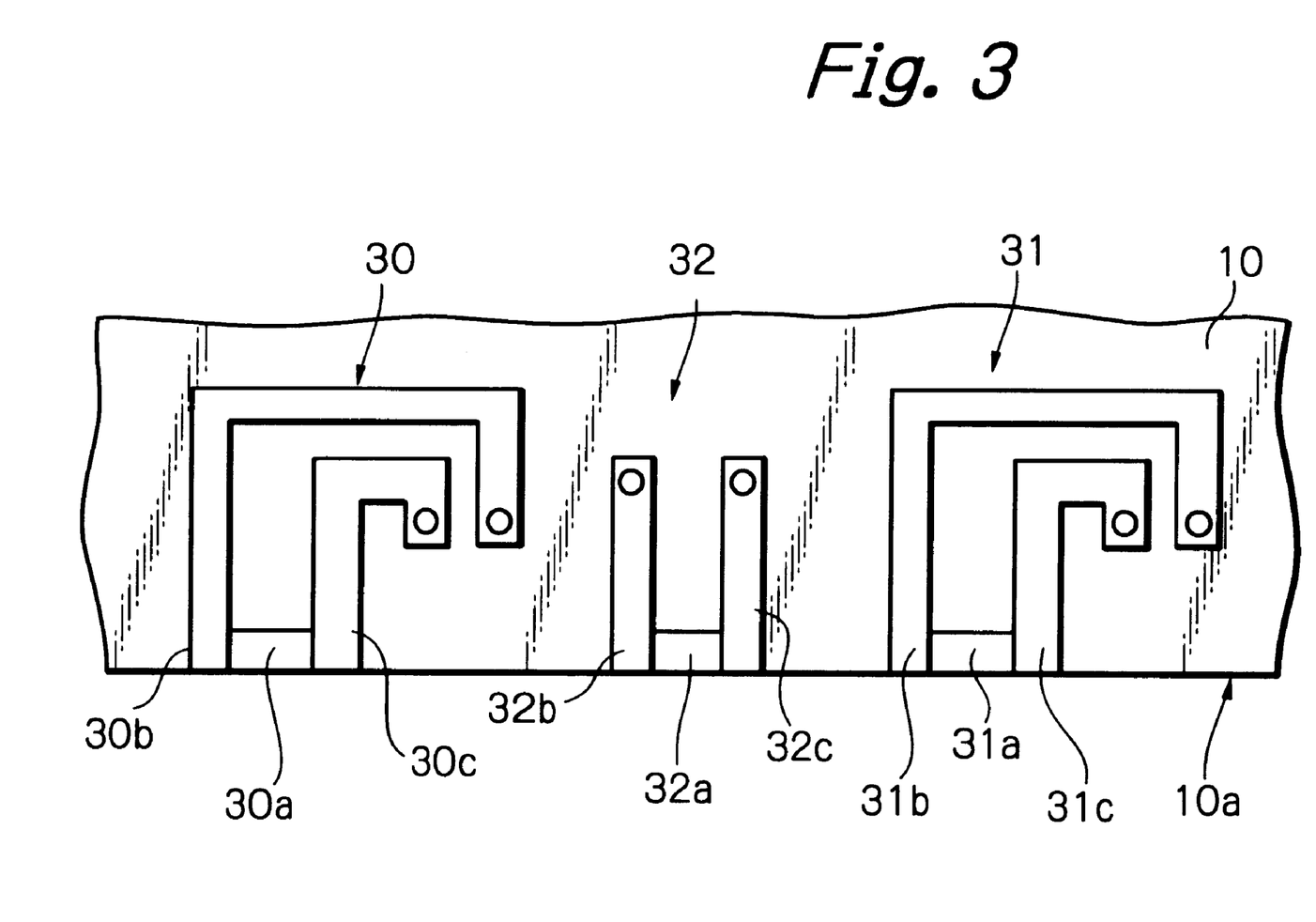
FIG. 3 is a view schematically illustrating a planar structure of one of RLG sensors.

The RLG sensors 16 are simultaneously formed together with MR head elements in the wafer processing stage. The planar structure of one of the RLG sensors is shown in FIG. 3 which illustrates a plan view of MR head element portions and a RLG sensor portion of the bar 10. In this figure, although all the MR head element portions and the RLG sensor portion cannot be seen from outside due to an inductive head element multi-layered on this structure, a part of these layers on the bar 10 is transparently viewed.

In FIG. 3, reference numeral 10 denotes the bar, 10a denotes an ABS of the bar 10, which is to be lapped, 30 and 31 denote two of a plurality of MR head elements formed in one row along this bar 10, 32 denotes one of the RLG sensors formed in a space area between the MR head elements 30 and 31 in parallel with these MR head elements, 30a and 31a denote MR layers of the respective MR head elements 30 and 31, 30b and 31b, and 30c and 31c denote lead conductors connected to both ends of the MR layers 30a and 31a, 32a denotes a resistor layer of the RLG sensor 32, and 32b and 32c denote lead conductors connected to both ends of the resistor layer 32a. The MR layers 30a and 31a and the resistor layer 32a run in parallel with the ABS 10a.

The JIGNODB table 18 is a reference table in which relationships of a wafer number for identifying the wafer, a bar number for identifying the bar 10 and a jig number of the jig 11 to which the bar 11 is attached are stored. The jig number is used as a retrieval key in this JIGNODB table 18. The WAFERDB table 19 is a database in which a wafer number is used as a first retrieval key and a bar number is used as a second retrieval key. In the table 19, various machining data inherent to each bar are stored so that the data can be taken out in a unit of bar.

The RLG sensor height optical measuring device 20 optically measures non-lapped RLG sensor height in the wafer processing stage. The optically measured data with respect to RLG sensor height hereinafter referred to as MSI data is transferred to the WAFERDB table 19 through the LAN 21 during the wafer processing stage.

Figure 4:
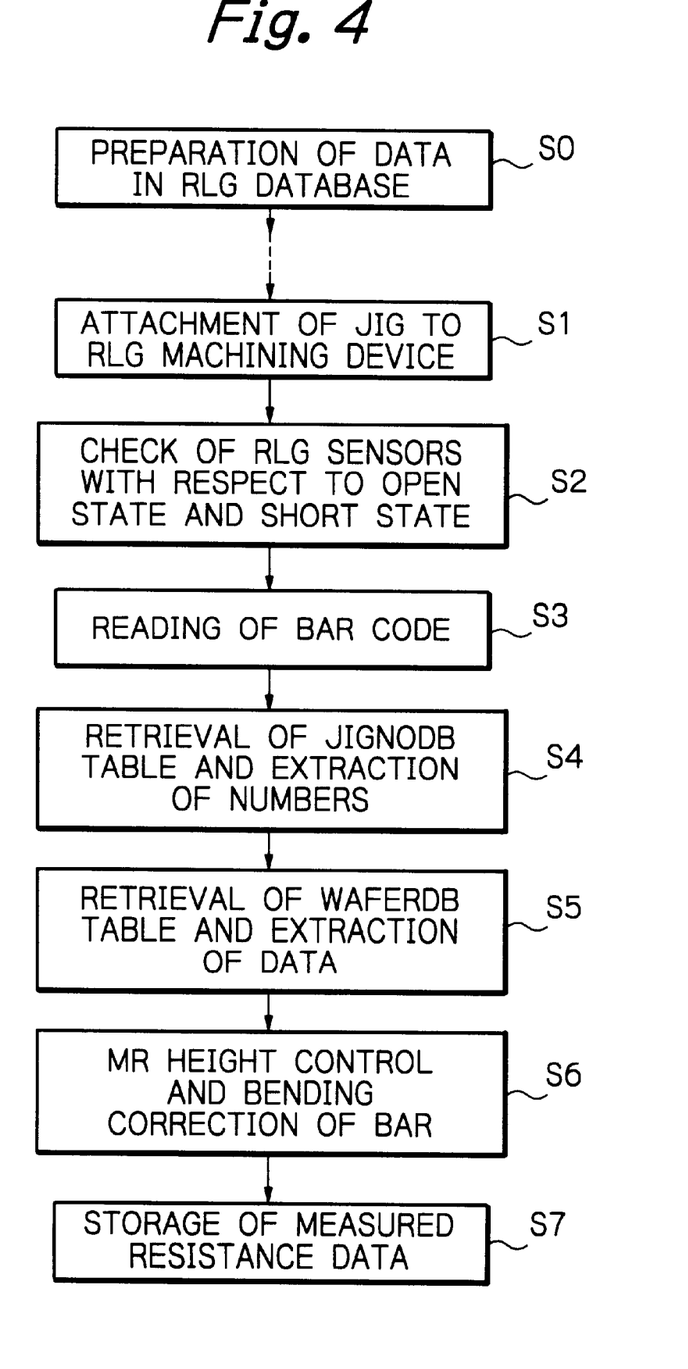
FIG. 4 is a flow chart schematically illustrating a flow of a RLG machining process.

FIG. 4 schematically illustrates a flow of the RLG machining process in this embodiment.

Before starting the RLG machining process, data are prepared in the RLG database 17 (step S0). That is, during the wafer processing stage, parameters inherent to each bar, which are necessary for calculation of MR height and calculated from measured resistance data from the RLG sensors 16 and MSI data from the optical measuring device 20, machining target values of the MR height and machining standards (errors) are stored in the WAFERDB table 19 for each bar in a unit of wafer. Furthermore, each bar 10 separated from the wafer by cutting is adhered to the machining jig 11, and relationships of the wafer number for identifying the wafer, the bar number for identifying the bar 10 and the jig number of the jig 11 to which the bar 10 is adhered are stored in the JIGNODB table 18.

The parameters inherent to each bar which are necessary for calculation of the MR height and stored in the WAFERDB table 19 are calculated as follows.

Figure 5:
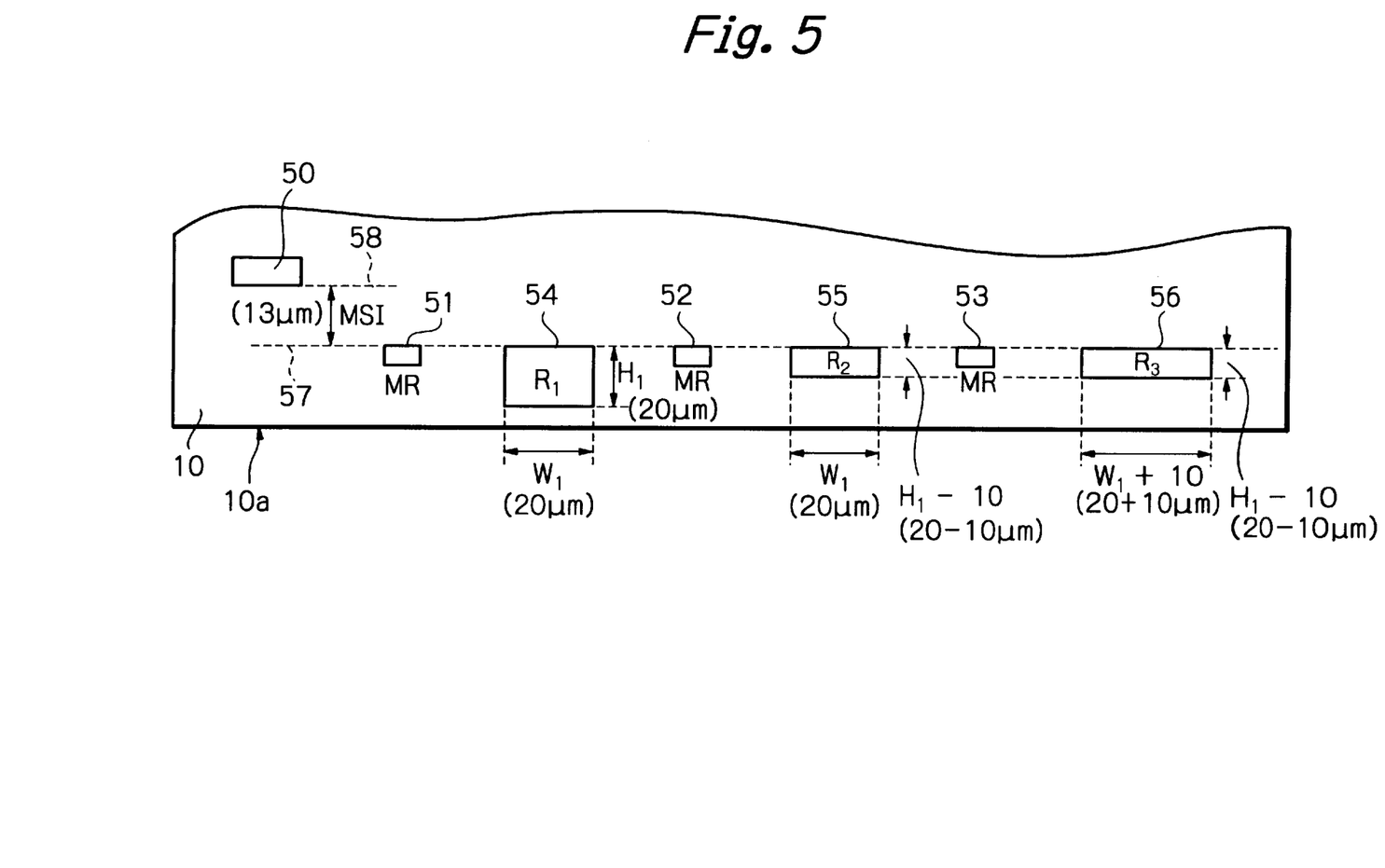
FIG. 5 is a view illustrating arrangement and pattern of MR head elements and RLG sensors on a bar.

As shown in FIG. 5, a marker 50, a plurality of MR head elements 51, 52, 53, . . . , and RLG sensors 54, 55, 56, . . . are formed on the single bar 10 in rows. The MR head elements 51, 52 and 53 and the first, second and third RLG sensors 54, 55 and 56 are alternately aligned. These RLG sensors 54, 55 and 56 have patterns different from each other. A plurality of sets, for example, 12 sets of the first, second and third RLG sensors 54, 55 and 56 are formed on the single bar 10. This 12 sets case corresponds to a case of 30% shrink magnetic head. Edges 57 opposite to the ABSs 10a of the MR head elements and the RLG sensors are aligned on the same line which is parallel to the ABS 10a. Although omitted in FIG. 5, to these MR head elements and RLG sensors are connected lead conductors as shown in FIG. 3.

Width and height of the first RLG sensor 54 are defined as $W_1$ and $H_1$ ($\mu$m), width and height of the second RLG sensor 55 are defined as $W_1$ and $H_1-10$, width and height of the third RLG sensor 56 are defined as $W_1+10$ and $H_1-10$.

In order to correct a difference between a designed pattern size on a mask used for making these pattern and an actual pattern size of the bar, distance (MSI) between the edge 58 positioned on the ABS side of the marker 50 and the edges 57 opposite to the ABS side of the MR head elements and RLG sensors is measured by the optical measuring device 20. Then, the difference between the measured MSI data and the designed value of 13 μm for example is added to or subtracted from $H_1$. The designed value of $H_1$ is 20 μm, and the designed value of $W_1$ is also 20 μm.

A resistance value $R_1$ of the first RLG sensor 54, a resistance value $R_2$ of the second RLG sensor 55, and a resistance value $R_3$ of the third RLG sensor 56 are given by the following expressions;

$$R_1 = R_L + (C + S \times W_1)/H_1$$

$$R_2 = R_L + (C + S \times W_1)/(H_1 - 10)$$

$$R_3 = R_L + \{C + S \times (W_1 + 10)\}/(H_1 - 10)$$

where $R_L$ represents a resistance value of lead conductors, S represents a sheet resistance value defined by the material and thickness of a resistor layer, and C represents other resistance (resistance value per a unit of height) such as crowding resistance.

$(C + S \times W_1)$ and $R_L$ can be calculated using $R_1$ and $R_2$ in these expressions as follows.

$$C + S \times W_1 = -H_1 \times (H_1 - 10) \times (R_1 - R_2)/10$$

$$R_L = R_1 + (H_1 - 10) \times (R_1 - R_2)/10$$

Thus, $(C + S \times W_1)$ and $R_L$ are calculated with $H_1$ corrected by MSI data and resistance data $R_1$ and $R_2$ actually measured by the first and second RLG sensors 54 and 55, using the above-described expressions. Then, the obtained values are stored in WAFERDB table 19.

RLG machining process is actually started from step S1 in FIG. 4. First, the jig 11 to which the bar 10 to be lapped is adhered is placed on the RLG machining device 14 (step S1). After the placement, with respect to all the RLG sensors 16, whether they are in open state (resistance value is infinite) or in short state (resistance value is substantially zero) is checked (step S2). The RLG sensor in open state or in short state is treated as invalid RLG sensor and the detection signal from the invalid RLG sensor is not used for the RLG machining process. Then, the bar code 13 described on the jig 11 is read out by the bar code reader 12 (step S3).

Thus, the computer 15 obtains a jig number from input bar code data, and retrieves the JIGNODB table 18 of the RLG database 17 by referring to the obtained jig number, and extracts a wafer number and a bar number (step S4).

Then, the WAFERDB table 19 of the RLG database 17 is retrieved by referring to these wafer number and bar number, and parameters inherent to the bar, a target value of MR height machining, and machining standards (errors) thereof are extracted from the table 19 (step S5).

Then, lapping of the ABS or MR height control is executed with correcting bending of the bar based upon the above-mentioned extracted data by the RLG machining process so that the MR heights at a plurality of positions of the bar become a target value (step S6).

Figure 6:
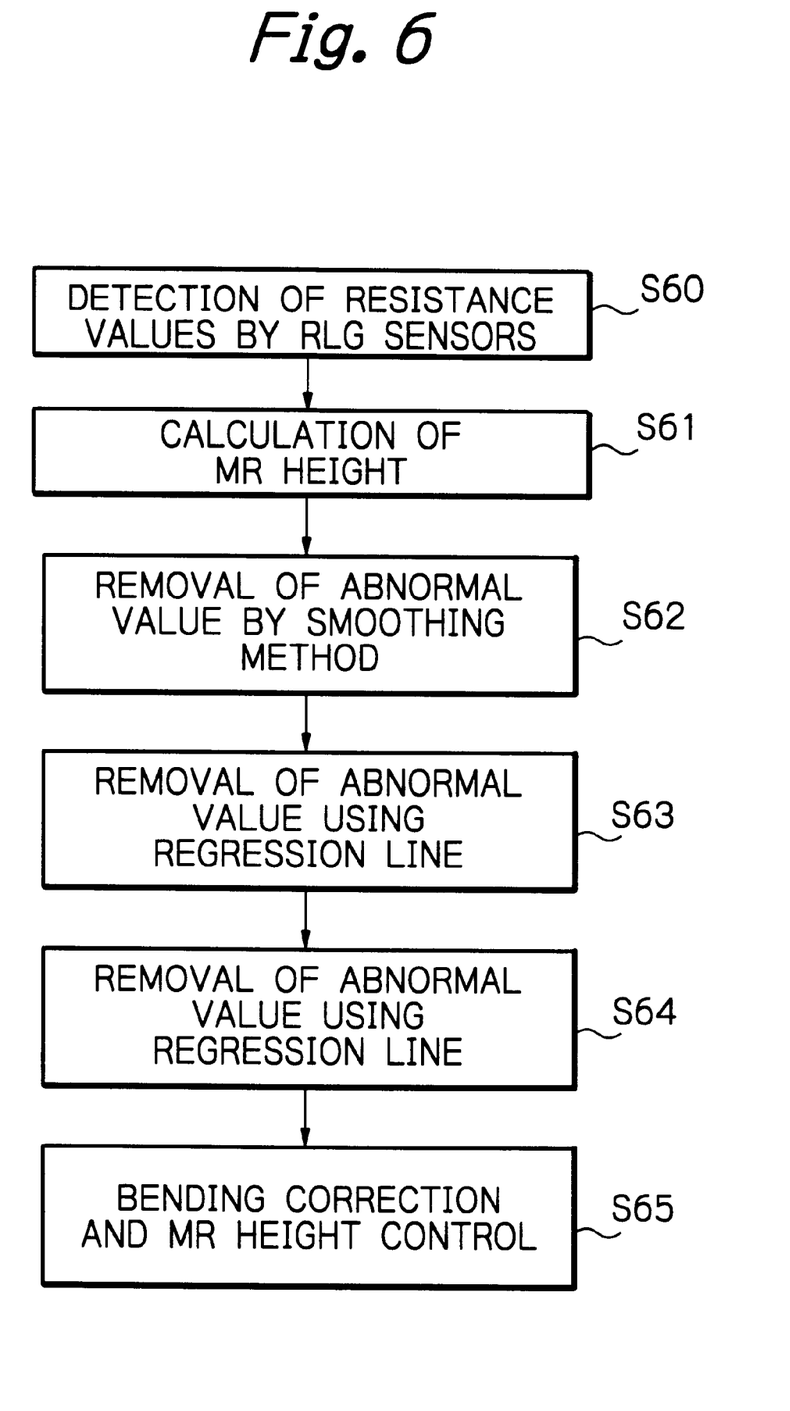
FIG. 6 is a flow chart illustrating in detail a flow of a MR height control process and a bending correction process in the RLG machining process shown in FIG. 4.

FIG. 6 illustrates this MR height control process with bending correction at the step S6. The following processes at steps S60 to S65 are repeatedly executed at a predetermined interval of for example 10 seconds.

First, resistance values of the normal RLG sensors 16 which are not treated as the invalid sensor at the step S2 are detected (step S60), and MR heights HMR at that time are calculated based upon the detected resistance values (step S61).

In this embodiment, the resistance values $R_1$ and $R_2$ of the first and second RLG sensors 54 and 55 are detected and MR height is calculated from the detected resistance values with respect to each set. The MR height HMR is calculated by parameters $R_L$ and $(C + S \times W_1)$ inherent to the bar and by detected resistance data $R_1$ or $R_2$, using the following expression;

$$H_{MR} = (C + S \times W_1)/(R_1 - R_L)$$

or $$H_{MR} = (C + S \times W_1)/(R_2 - R_L).$$

Then, the RLG sensor which causes an abnormal value (an extremely different value in comparison with other values) of the calculated MR height is treated invalid, that is, the resistance value from this RLG sensor is removed, by using a smoothing method (step S62).

Figure 7:
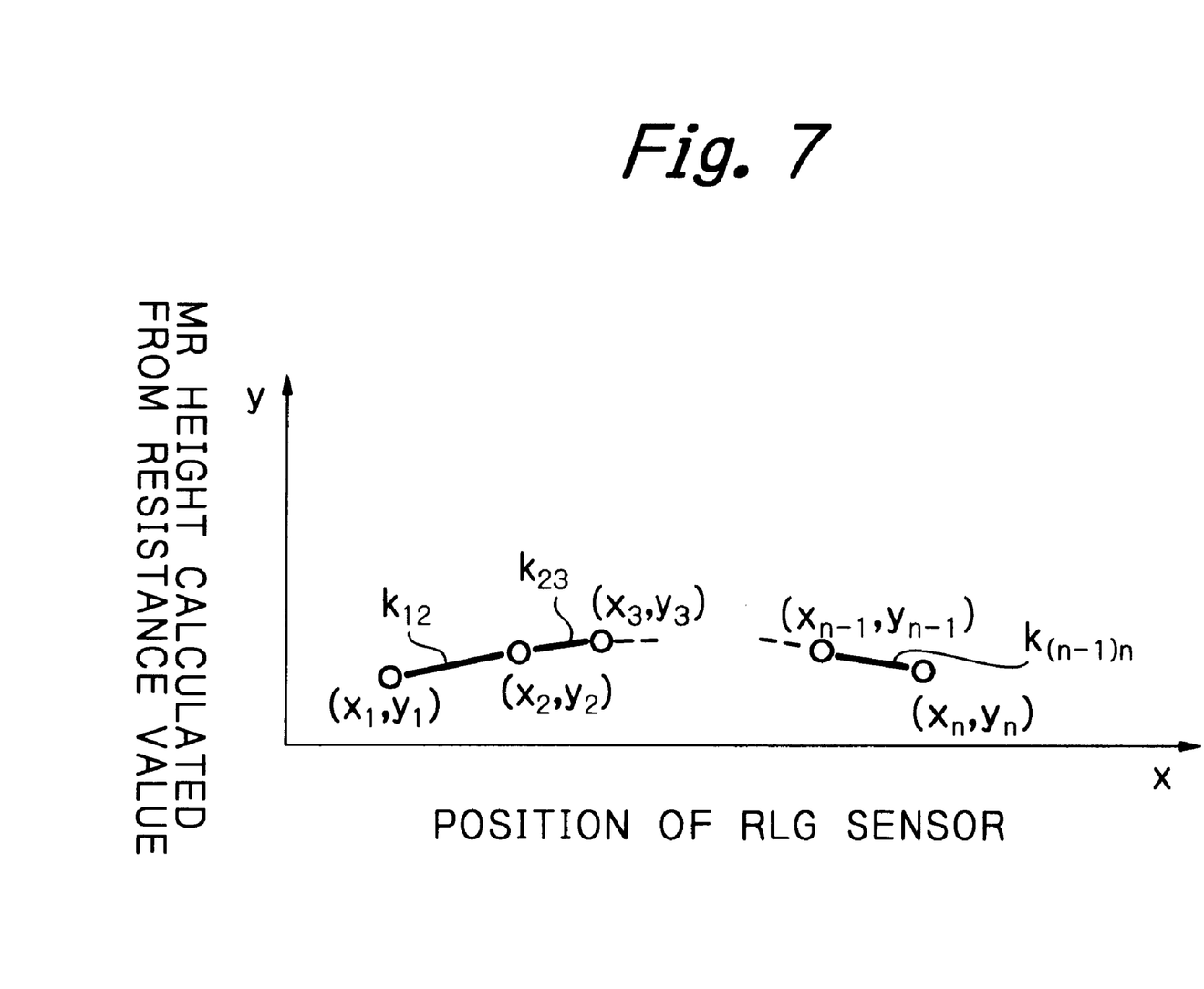
FIG. 7 is a graph for illustrating a smoothing method.

Hereinafter, the smoothing method will be described in detail. FIG. 7 shows a schematic graph of two-dimensional coordinates of x and y, where x is a position of each RLG sensor and y is a MR height calculated from the resistance value of this RLG sensor. According to the smoothing method, first, an inclination $k_{(i-1)i}$ between adjacent two points $x_{i-1}$ and $x_i$ (i=2, ... , n) shown in this figure is calculated;

$$k_{12} = (y_2 - y_1)/(x_2 - x_1),$$

$$k_{23} = (y_3 - y_2)/(x_3 - x_2), \ldots$$

$$k_{(n-1)n} = (y_n - y_{(n-1)})/(x_n - x_{(n-1)}).$$

These inclinations $k_{(i-1)i}$ represent a rate of change between the resistance values of adjacent two RLG sensors with respect to a distance between these two RLG sensors.

Then, a positive square root of sum of squares of differences between two sequential inclinations $k_{(i-1)i}$ and $k_{(i-2)(i-1)}$ is calculated. This calculated value represents $S_{mooth}$ as follows. In other words, it represents a positive square root of sum of squares of differences between the rates of change of a certain RLG sensor with respect to two RLG sensors adjacent to the certain RLG sensor.

$$S_{mooth} = \sqrt{\{(k_{23} - k_{12})^2 + \ldots + (k_{(n-1)n} - k_{(n-2)(n-1)})^2\}}$$

If the calculated $S_{mooth}$ is greater than a $S_{mooth}$ reference value of for example 10, which is determined in accordance with the required accuracy of the MR height ($S_{mooth} > 10$) it is judged that there is an abnormal value in the calculated MR heights and thus either the maximum value or the minimum value of the MR heights is removed. Which value should be removed is determined as follows. First, among the MR heights y used in the calculation of $S_{mooth}$, values $y_U$ greater than an average value <y> of the MR heights y and values $y_L$ smaller than the average value <y> are extracted. When the number of the extracted values $y_U$ is smaller than the number of the extracted values $y_L$, the maximum value is removed. Contrary to this, when the number of the extracted values $y_L$ is smaller than the number of the extracted values $y_U$, the minimum value is removed.

Figure 8A:
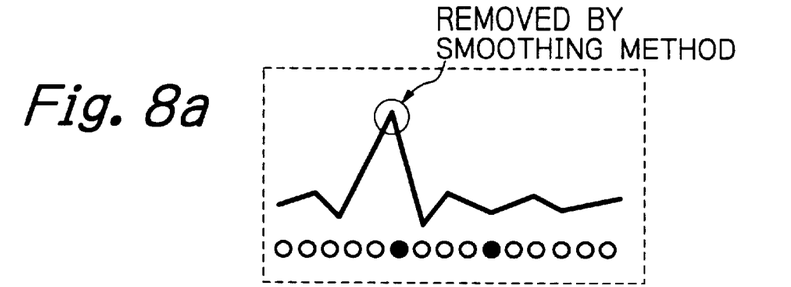
FIGS. 8a to 8e are views illustrating a flow of abnormal value removing steps in the process shown in FIG. 6.

After the removal of the maximum or minimum value of the MR height, namely after the removal of the resistance value of the invalid RLG sensor, $S_{mooth}$ is calculated again with respect to the MR heights obtained from the resistance values of the remaining RLG sensors and the maximum or minimum value is removed if the calculated $S_{mooth}$ is greater than 10. These processes are repeated until the calculated $S_{mooth}$ becomes 10 or less. FIG. 8a illustrates the above-mentioned first abnormal value removing processes using the smoothing method.

Figure 8B:
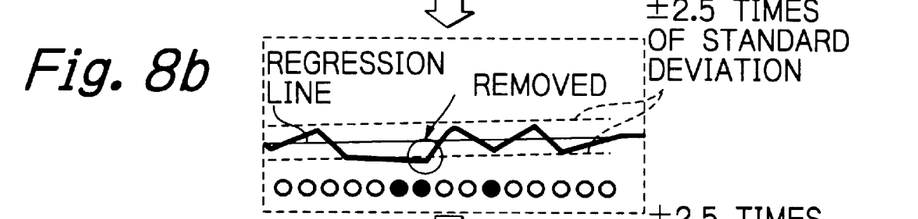

Then, an average value, a standard deviation and a regression line with respect to the MR heights obtained from the resistance values of the remaining RLG sensors are calculated. If the MR height is beyond a range of ±2.5 times of the standard deviation from the calculated regression line, the resistance value of the RLG sensor with respect to this MR height is omitted (step S63). In stead of the range of ±2.5 times of the standard deviation from the regression line, a range of ±30% of the average value from the regression line may be used. Namely, if the MR height is beyond the range of ±30% of the average value from the calculated regression line, the resistance value of the RLG sensor with respect to this MR height is omitted. This range is not of course limited to the value of ±2.5 times of the standard deviation nor to the value of ±30% of the average value. FIG. 8b illustrates this second abnormal value removing process.

Figure 8C:
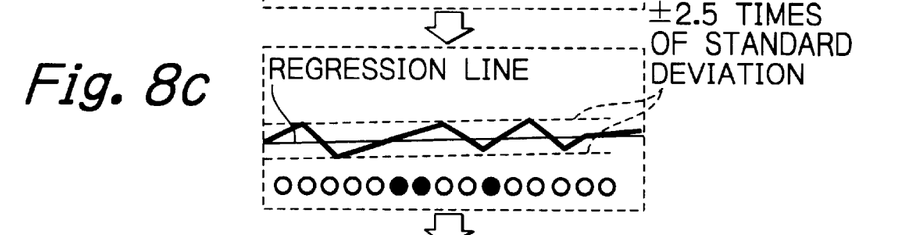

Then, similar to the above-mentioned second abnormal value removing process, an average value, a standard deviation and a regression line with respect to the MR heights obtained from the resistance values of the remaining RLG sensors are calculated. If the MR height is beyond a range of ±2.5 times of the standard deviation from the calculated regression line, the resistance value of the RLG sensor with respect to this MR height is omitted (step S64). In stead of the range of ±2.5 times of the standard deviation from the regression line, a range of ±30% of the average value from the regression line may be used. This range is not of course limited to the value of ±2.5 times of the standard deviation nor to the value of ±30% of the average value. FIG. 8c illustrates this third abnormal value removing process.

During the first to third abnormal value removing processes, if the MR height calculated from the resistance value of the RLG sensor located nearest to one end of the bar 10 is abnormal and the resistance value of this RLG sensor is omitted, a substitute MR height which is obtained by interpolation from the MR height calculated from the resistance value of the adjacent RLG sensor is used.

Figure 8D:
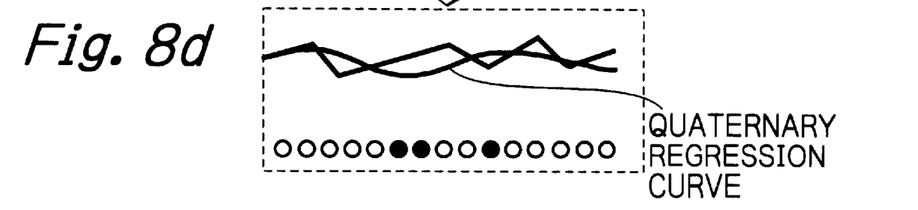

Thereafter, a quaternary regression curve with respect to the MR heights obtained from the resistance values of the remaining RLG sensors is calculated, and the lapping of the MR height is executed with driving linear DC motors (not shown) in the RLG machining device 14 to correct the bending of the bar 10 so that the quaternary regression curve approaches to a straight line (step S65). FIG. 8d illustrates this process.

Figure 8E:
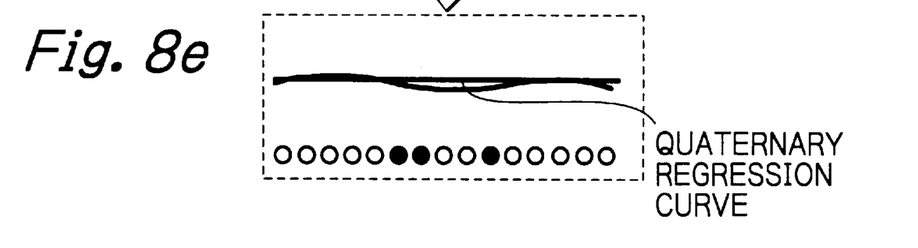

The aforementioned RLG machining control at steps S60 to S65 are repeated at a predetermined interval such as for example 10 seconds until the average value of the MR heights calculated from the resistance values of the RLG sensors reaches its standard value or its target value. The RLG machining control is finished when the average MR height reaches the standard value. At that time, the quaternary regression curve will become substantially straight line as shown in FIG. 8e.

After the RLG machining process is completed, finally measured resistance data $R_1$ and $R_2$ are stored in the WAFERDB table 19 (step S7 of FIG. 4).

As aforementioned, according to this embodiment, MR height control and correction of bending of the bar are executed after an abnormal value of the MR heights calculated from the resistance values of the respective RLG sensors 16 is omitted. Therefore, the machining control can be always performed in accordance with the correct data causing decrease in magnetic head yields to prevent.

Although in the above-mentioned embodiment, the RLG machining process according to the present invention is applied to the MR height control of the bar, it is apparent that the present invention can be used in various bar machining control using detection signals from sensors other than the MR height control. Furthermore, the present invention can be applied to various machining control of workpieces other than the bar with a plurality of magnetic head sliders.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for controlling a machining process of a workpiece comprising the steps of:

measuring amounts of machining of the workpiece by a plurality of sensors located at different positions on the workpiece, said sensors providing detection signals which represent respective measured amounts;

removing a detection signal when the detection signal has an abnormal value which is extremely different in comparison with values of the other detection signals by using a smoothing method; and controlling the machining of the workpiece depending upon the remaining detection signals from said sensors, wherein said removing step includes a step of calculating each rate of change between values of the detection signals of adjacent two sensors with respect to a distance between said adjacent two sensors, and a step of determining removal of the detection signal of each sensor depending upon a difference in the rates of change of said each sensor with respect to two sensors adjacent to said each sensor.

2. The method as claimed in claim 1, wherein said removing step further includes a step of omitting the detection signal with either the maximum value or the minimum value when a positive square root of sum of squares of differences of said rates of change exceeds a predetermined value.

3. A method for controlling a machining process of a workpiece comprising the steps of:

measuring amounts of machining of the workpiece by a plurality of sensors located at different positions on the workpiece, said sensors providing detection signals which represent respective measured amounts;

removing a detection signal when the detection signal has an abnormal value which is extremely different in comparison with values of the other detection signals by using a smoothing method; and controlling the machining of the workpiece depending upon the remaining detection signals from said sensors, wherein said removing step includes a step of calculating an average value, a standard deviation and a regression line of values of the detection signals, a step of determining removal of the detection signal when a value of said detection signal is out of a range from the calculated regression line, said range being predetermined in accordance with a required precision for machining the workpiece, and a step of omitting the detection signal when said determining step determines the removal of the detection signal.

4. The method as claimed in claim 3, wherein said calculating step, said determining step and said omitting step are repeated.

5. The method as claimed in claim 3, wherein said controlling step includes a step of calculating a quaternary regression curve depending upon the remaining detection signals from said sensors, and a step of executing the machining control of said workpiece so that the calculated quaternary regression curve approaches to a straight line.

6. The method as claimed in claim 3, wherein said workpiece is a bar on which a plurality of thin-film magnetic head elements are aligned, said bar being formed by cutting a wafer.

7. The method as claimed in claim 6, wherein said controlling step includes a step of controlling a properties-determining height of the thin-film magnetic head elements on the bar by lapping an air bearing surface of the bar and by correcting bending of the bar, and wherein the values of the detection signals are machining amount values of said properties-determining height obtained from sensed signals of a plurality of sensors located at different positions on the bar.

8. The method as claimed in claim 7, wherein said properties-determining height controlling step includes a step of measuring resistance values of said sensors, said resistance values being varied in accordance with the lapping and the correction of bending, and a step of calculating said machining amount values in accordance with said measured resistance values.

9. The method as claimed in claim 7, wherein said controlling step includes a step of interpolating, when said removed detection signal is a signal from the sensor located nearest to one end of the bar, the values of the detection signals from the sensor adjacent to said end located sensor used to provide a substitute detection signal, said properties-determining height control step being executed by using the remaining detection signals and the substitute detection signal.

* * * * *